Figure 1:
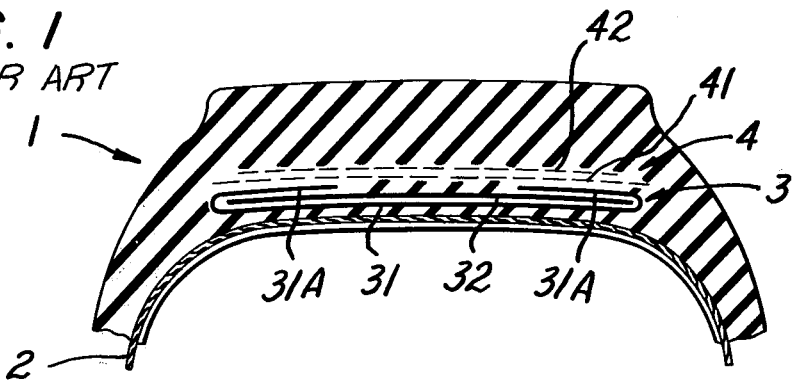

United States Patent [19]
Boileau

[11] 4,184,529
[45] Jan. 22, 1980

[54] TIRE HAVING A TREAD REINFORCEMENT
[75] Inventor: Jacques Boileau, Clermont-Ferrand, France
[73] Assignee: Compagnie Generale des Etablissements Michelin, Clermont-Ferrand, France
[21] Appl. No.: 820,852
[22] Filed: Aug. 1, 1977
[30] Foreign Application Priority Data
Feb. 8, 1977 [FR] France ............... 7623648
[51] Int. Cl.² .................... B60C 9/18
[52] U.S. Cl. ..................... 152/361 FP
[58] Field of Search ........... 152/361 FP, 361 DM, 152/361 R, 354 R

[56] References Cited
U.S. PATENT DOCUMENTS

| 3,831,656 | 8/1974 | Senger et al. | 152/361 FP |
| 3,945,422 | 3/1976 | Pottinger | 152/361 DM |
| 3,949,797 | 4/1976 | Mirtain et al. | 152/361 FP |
| 4,067,372 | 1/1978 | Masson | 152/354 R |

FOREIGN PATENT DOCUMENTS

| 2428386 | 12/1974 | Fed. Rep. of Germany | 152/361 FP |
| 1299622 | 6/1962 | France | 152/361 FP |
| 1473029 | 2/1967 | France | 152/361 FP |

Primary Examiner—Joseph F. Peters, Jr.
Assistant Examiner—D. W. Underwood
Attorney, Agent, or Firm—Brumbaugh, Graves, Donohue & Raymond

[57] ABSTRACT

A tread reinforcement of an off the road tire for heavy carrier vehicles comprises at least three plies, two of which each have a strength substantially less than the third, one of these two plies having its edges folded at least around the edges of the third.

8 Claims, 7 Drawing Figures

TIRE HAVING A TREAD REINFORCEMENT

This invention relates to improvements in tires of the radial carcass reinforcement type provided with a tread reinforcement and intended to be used as off the road tires on heavy carrier vehicles.

The tread reinforcement which surrounds the radial carcass reinforcement is formed of at least two plies, the reinforcement elements of which, namely, wires or cables, which are parallel within a given ply, cross each other from one ply to the next and are arranged obliquely with respect to the circumferential direction of the tire. Radially outward from the tread reinforcement proper (so-called because it participates in the strength of the tire) is at least one protective ply, generally reinforced with elastic cables, the sole function of which is to protect the tread reinforcement against injuries caused by cutting bodies which may be located in the path of the tire. The present invention concerns solely the tread reinforcement proper.

Tread reinforcements formed of at least two superimposed crossing piles have a common defect which is found both in road tires and in off the road tires, although the factors which give rise to this defect are not the same, namely, the edges of the plies have a tendency to separate as a result of fatigue of the bonding rubber between plies. In the case of road tires, this fatigue is related to the frequency of rotation, that is to say to the speed at which the tire travels and the centrifugal force which acts on the tread of the tire. In the case of off the road tires, the speed of the vehicles is, on the other hand, relatively moderate, but the tires are subjected to heavy static loads and the tread reinforcement, when traveling over the obstacles of all dimensions over which the tires ride, suffers considerable deformations which go beyond the flattening of the tread reinforcements and reach curvatures of very high value of a sign opposite to the curvature assumed by the tread reinforcement under the effect of the inflation pressure.

In the case of road tires, one means utilized to avoid the edge separation of the plies of the tread reinforcement consists in folding the edges of one of the tread reinforcement plies around the edges of the other plies. The cables of the folded ply, together with those of the other plies, then form reinforcements of the edge zones which counteract the separation of the edges.

Due to the large dimensions and considerable loads of off the road tires, a proper strength of the tread reinforcement can be reached only by using steel cables whose diameter equals, and even exceeds, several millimeters. The stiffness of such cables prevents their use in a folded edge ply, on the one hand, as a result of the difficulties encountered in folding the edges of the ply and, on the other hand, because the components of the cables experience, upon the folding, deformations which are prejudicial to a normal life of the cables under conditions of operation off the road, which are very harsh, as is known.

The object of the present invention is to provide a tread reinforcement for radial tires intended for heavy (including very heavy) carrier vehicles traveling off the road, formed of at least one nonfolded ply and at least one ply with folded edges surrounding the edges of the nonfolded ply and free of the above defects while offering improved resistance to edge separation of the plies.

Thus the tire in accordance with the present invention for heavy carrier vehicles traveling off the road, having a radial carcass reinforcement and a tread reinforcement formed of three oblique cabled plies, two of which have nonfolded edges and one of which has its edges folded around the edges of at least one of the two plies with nonfolded edges, is characterized by the fact that one of the plies with nonfolded edges and the ply with folded edges have their cables sustantially parallel to one another but crossed with the cables of the other ply with nonfolded edges, and by the fact that the sum $(k_1f_1+k_2f_2)$ of the strengths ($k_1f_1$, respectively $k_2f_2$) of the two plies with substantially parallel cables is equal to the strength $k.f$ of a single ply with folded edges (so-called normal folded edge ply) having the same direction $\alpha_1$ with respect to the longitudinal direction of the tire, $f=(p\cdot r/1+\cot\alpha_1\cdot\tan\alpha_2$ being the unit force acting on said normal folded edge ply, $f_1$ and $f_2$ being the unit forces acting on the two fractional plies and their sum being equal to $f$, $\alpha_2$ being the orientation of the ply with nonfolded edges whose cables cross those of the two fractional plies, $k$, $k_1$ and $k_2$ being the safety coefficients pertaining to the normal folded edge ply and to the two fractional plies, said coefficients being selected between 5 and 10, $p$ being the inflation pressure and $r$ the equatorial radius of the normal folded edge ply.

The equality of the sum of the strengths of the fractional plies and the strength of the normal folded edge ply is to be understood to be of a tolerance of $+10\%$, referred to the strength of the normal ply.

The basic concept of the invention, which is particularly original in off the road tires, consists in replacing the normal folded edge ply by at least two fractional plies of a total strength equal to that of the single replaced folded ply, at least one of these two replacement plies being a ply with folded edges and the other replacement ply being a ply with nonfolded edges.

A tread reinforcement in accordance with the invention thus consists fundamentally of three plies: namely, two plies, one with folded edges and the other with nonfolded edges, which together result from the fractionating of the normal tread reinforcement ply having folded edges, and at least one third ply with nonfolded edges, which is a normal tread reinforcement ply and onto which acts the unit force $f'=(p\cdot r/1+\cot\alpha_2\cdot\tan\alpha_1)$.

The arrangement of the tread plies in accordance with the invention offers a number of advantages in the case of off the road tires. On the one hand, the folding of the edges of the fractional folded edge ply is facilitated, since the cables reinforcing said ply are less numerous and/or of smaller diameter and therefore more flexible. In certain cases it is enough to use synthetic textile cords. Being more flexible, such cords are free, at the place where they are located, of deformations which are prejudicial to their endurance. On the other hand, and this is an unexpected consequence to the invention, due to the conditions of travel off the road which result in strong variations in curvature in all directions of the tread reinforcement, the reinforcement of the edges produced by a normal folded edge ply would be excessive to the point of jeopardizing the separation life of the tread plies or of increasing the vulnerability of the tread to cuts. The fractionating of the normal folded edge ply in accordance with the present invention makes it possible, on the other hand, to have a folded edge which stiffens the edge zones of the tread reinforcement to a lesser extent, and therefore a tread reinforcement whose edges are not only more flexible, so as to adapt themselves more easily to the shape of obstacles, but also sufficiently reinforced not to be subject to the separation of the plies which is caused by excessive deformations of the tread reinforcement. Of course, the fractionation in accordance with the invention makes it possible to determine as desired both the strength of the tread reinforcement and the flexibility of the edge zones thereof. At the limit, the fractionation of the normal folded edge tread ply is completely dependent on the flexibility which it is desired to impart to the edges of the tread reinforcement.

The invention is independent of the order of superimposition of the fractional nonfolded edge plies and the normal nonfolded edge ply, provided that the fractional folded edge ply surrounds the edges of the normal nonfolded edge ply and possibly those of the fractional nonfolded edge ply resulting from the fractionating in accordance with the invention, the plies which form the tread reinforcement in accordance with the invention of course having cables which cross one another in two directions.

The strength of a tread ply is expressed in daN per centimeter of width of ply measured perpendicularly to the reinforcement elements of the ply in question.

Elementary calculation makes it possible to evaluate the unit force f (per cm) acting parallel to the cables of a normal folded edge ply in the case of a tread reinforcement formed of two plies, for instance one with folded edges and the other with nonfolded edges.

This unit force is given by the expression:

$$f = p \cdot r / 1 + \cot \alpha_1 \cdot \tan \alpha_2$$

in which $p \cdot r$ is the force acting longitudinally per unit of width measured in the axial direction of the tire on the tread reinforcement of equatorial radius r under the effect of the inflation pressure p;

$\alpha_1$ is the angle which the cables of the normal ply the unit force f of which is to be calculated make with the circumferential direction of the tire, and $\alpha_2$ is the angle which the cables of the other normal ply make with the circumferential direction of the tire.

If f designates the unit force (per cm) which the normal folded edge ply must withstand and if it is desired to use a fractional folded edge ply of strength $f_1$, the force which the fractional nonfolded edge ply must withstand is $f_2 = f - f_1$. It is clear that the above figures are considered before the application of the safety coefficients k, $k_1$ and $k_2$, which are always greater than one and preferably between 7 and 10.

Various means can be used to modify the strength of a ply, and therefore its flexibility, in the case of a folded edge ply: namely, decrease of the useful cross section of the material or modification of the material forming the cables itself, increase of the pitch of the cables, use of elastic cables, and modification of the obliqueness with respect to the circumferential direction of the tire. This last means also makes it possible to vary or adapt the flexibility of the entire tread reinforcement on basis of the obstacles which appear in the path of the tire.

The drawing to which the portion of the description which follows refers is intended to show illustrative but not limitative embodiments of the invention.

Figure 2:
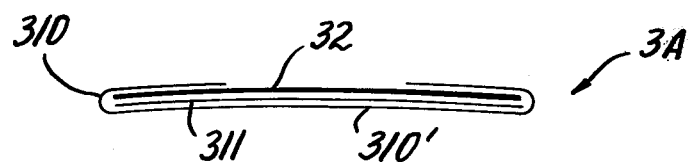
Figure 5:
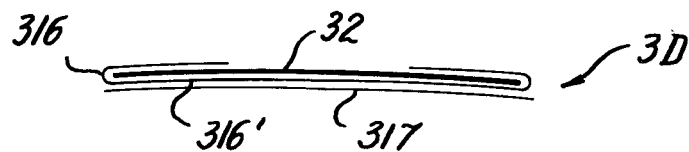
Figure 6:
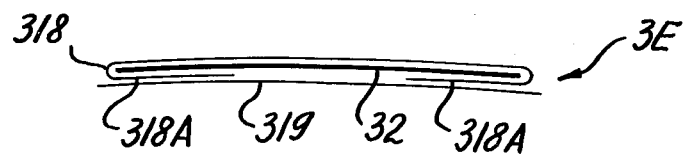
Figure 7:
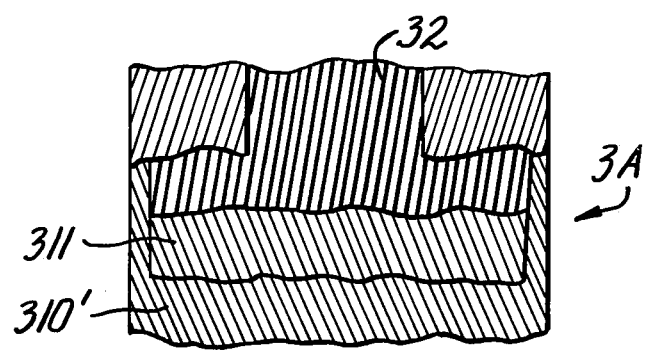

In the drawing:

FIG. 1 shows schematically, in radial cross section, the tread of a tire corresponding to the prior art having a tread reinforcement formed of a normal nonfolded edge ply and of a normal folded edge ply, FIGS. 2 to 6 show schematically in radial cross section tread reinforcements in accordance with the invention, and FIG. 7 is a developed plan view, partly broken away, of a section of the tread reinforcement shown in FIG. 2.

In order to show the difference between the normal plies and the fractional plies, the normal plies are shown schematically in FIGS. 2 to 7 in heavy lines while the fractional plies are shown schematically in thin lines.

The tire, only the tread 1 of which is shown in radial cross section in FIG. 1, comprises a carcass reinforcement 2 and, radially outside the same, a tread reinforcement 3 surrounded by a protective reinforcement 4. The tread reinforcement 3 is formed of a normal nonfolded ply 32 and a normal folded ply 31 whose edges 31A are folded around the nonfolded edges of the normal nonfolded ply 32. The protective reinforcement 4 is formed of two plies 41, 42, each composed of flexible reinforcement elements such as, for instance, flexible steel cables in accordance with French Pat. No. 1,188,486, or polyamide or polyester cords.

The tread reinforcement 3A shown in FIGS. 2 and 7 results from the fractionating in accordance with the invention of the normal folded edge ply 31 of FIG. 1 into two fractional plies 310 and 311, the normal nonfolded edge ply 32 remaining entirely identical to that shown in FIG. 1. In this example, the fractional nonfolded edge ply 311 is adjacent the nonfolded portion 310′ of the fractional folded edge ply 310.

The cables of the fractional nonfolded edge ply 311 may be arranged, referred to the circumferential direction of the tire, at an angle of the same sign and of the same value ($\pm 5°$) as that of the cables of the fractional folded edge ply 310. Whatever the angle selected for the cables of the fractional nonfolded edge ply 311, the angle of the cables of the normal nonfolded edge ply 32 should be chosen in such a manner that these cables cross those of the fractional nonfolded edge ply 311.

A satisfactory arrangement of the tread reinforcement plies in accordance with the invention for a tire of size 18.00-25 intended to bear a payload of 10,000 daN and to be inflated to a pressure of 6 bars is as follows:

Fractional folded edge ply 310:

Flexible cables formed of 21 steel wires each having a diameter of 0.23 mm. and assembled in accordance with French Pat. No. 1,188,486:

total width: 450 mm.

width of each of the folded edges: 75 mm.

angle of the cables with respect to circumferential direction of the tire: +26° strength of the ply: 520 daN/cm ($f_1 = 52$ daN/cm, $k_1 = 10$).

Fractional nonfolded edge ply 311:

Cables formed of 48 steel wires each having a diameter of 0.26 mm. and assembled with a pitch of 3 mm.:

width: 280 mm.

angle of the cables with respect to the circumferential direction of the tire: +26°.

strength of the ply: 1600 daN/cm ($f_2 = 160$ daN/cm, $k_2 = 10$).

Normal nonfolded edge ply 32:

Cables formed of 48 steel wires each having a diameter of 0.26 mm. and assembled with a pitch of 2.8 mm.:

width: 280 mm.

angle of the cables with respect to the circumferential direction of the tire: −20° strength of the ply: 1600 daN/cm.

The two fractional plies 310 and 311 replace a normal folded edge ply 31 (FIG. 1) having a strength of 2100 daN/cm reinforced with cables each formed of 39 wires of a diameter of 0.26 mm., the unit force f acting on said normal folded edge ply being—in accordance with the relationship indicated above—of the order of 210 daN/cm and the safety coefficient k adopted being of the order of 10.

Figure 3:
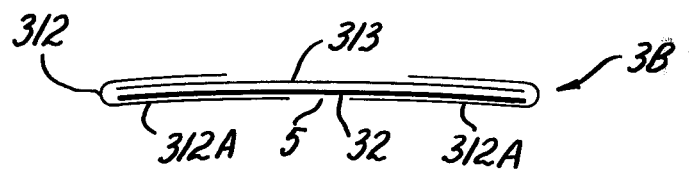

In the example shown in FIG. 3, the fractional folded edge ply 312 has been divided into two partial plies 312A, separated from each other by a median interruption zone 5 which makes it possible favorably to influence the flexibility of an intermediate zone between the edges of the tread reinforcement 3B of the off the road tire. The tread reinforcement 3B further contains the normal nonfolded edge ply 32 and the fractional nonfolded edge ply 313 thereabove.

A method of controlling the flexibility of the tread reinforcement and its ability to "pocket" obstacles without drawback consists in varying the angles formed by the cables of the different plies. Thus, referring back to FIG. 2, a more flexible tread reinforcement is obtained by arranging the cables of the fractional folded edge ply 310, for instance, at an angle between 26° and 40° instead of 26°, those of the fractional nonfolded edge ply 311 at an angle between 26° and 40° instead of 26°, and those of the normal nonfolded edge ply 32 at an opposite angle between 20° and 30° instead of 20°, these angles in all cases being measured with respect to the circumferential direction of the tire. Such a measure, combined with a fractional folded edge ply whose folded edges are of suitable width makes it possible suitably to distribute the flexibility of the tread reinforcement of the off the road tire.

Another method of controlling the flexibility in question consists in adequately distributing the partial forces ($f_1$, $f_2$) which act on the fractional plies, and/or the safety coefficients ($k_1$, $k_2$) of these plies. It is thus possible to impart different functions to the fractional plies. The one with nonfolded edges takes part in the strength (k.f) of the tread reinforcement, the other, with folded edges, takes part in the cohesion of the borders of said reinforcement, all this under favorable conditions, since the fatigue strength of the cables is not any more impaired by the folding operation. This method can advantageously be combined with the one mentioned just above.

If one wishes to reduce the flexibility of the tread reinforcement, one diminishes the angles of the cables of the plies 310, 311 and 32 with respect to the longitudinal direction. Suitable angle ranges are 26° to 15° for the cables of the fractional plies 310 and 311, 20° to 15° for those of the normal ply 32 with nonfolded edges.

Figure 4:
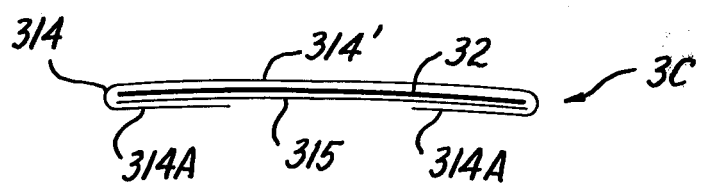

FIG. 4 shows a tread reinforcement 3C in which the nonfolded portion 314' of the fractional folded edge ply 314 with folded edges 314A in accordance with the invention is located radially outward both from the fractional nonfolded edge ply 315 and from the normal nonfolded edge ply 32. It results from this that the folded edges 314A of the fractional folded edge ply 314 are located radially inward of the plies 32 and 315. Furthermore, in this embodiment of the invention, the nonfolded portion 314' of the fractional folded edge ply 314 could present a median interruption zone similar to the median interruption zone 5 shown in FIG. 3. This tread reinforcement 3C lends itself also, in the same way as the tread reinforcement 3B shown in FIG. 3, to a general increase in the angles of the cables of the plies which form it, and therefore to greater flexibility.

FIGS. 5 and 6 illustrate the case in which only the normal nonfolded edge ply 32 is surrounded by the folded edges of the fractional folded edge plies 316 and 318, respectively. In FIG. 5, the fractional nonfolded edge ply 317 is adajcent the nonfolded portion 316' of the fractional folded edge ply 316, the tread reinforcement 3D of the invention being formed by the plies 32, 316 and 317.

In accordance with FIG. 6, the fractional nonfolded edge ply 319 is adjacent the folded edges 318A of the fractional folded edge ply 318 which surrounds the normal nonfolded edge ply 32, the tread reinforcement 3E in accordance with the invention being formed by the plies 32, 318 and 319.

As can be noted from all of the above embodiments, the principle of the invention makes it possible to use a fractional folded edge ply whose edges are folded either radially outward or radially inward. The radially outward direction of folding is preferable, since it is easier to effect.

What is claimed is:

1. In a tire for heavy carrier vehicles traveling off the road, having a radial carcass reinforcement and a tread reinforcement formed of oblique steel cable plies, the improvement wherein
    said oblique steel cable plies have about the same axial width and consist of a normal nonfolded edge ply, a fractional nonfolded edge ply and a fractional folded edge ply,
    the two edges of the fractional folded edge ply being folded around at least the edges of the normal nonfolded edge ply,
    the oblique steel cables of the fractional nonfolded edge ply and the oblique steel cables of the fractional folded edge ply being substantially parallel to one another but crossed with the oblique steel cables of the normal nonfolded edge ply, and
    the sum of the strengths of the two fractional plies being equal to the strength of a comparison normal folded edge ply having oblique steel cables oreinted in the same direction as that of the oblique steel cables of the two fractional plies.

2. The improved tire defined by claim 1 wherein the two edges of the fractional folded edge ply are also folded around the edges of the fractional nonfolded edge ply.

3. The improved tire defined by claim 1 wherein the oblique steel cables of the fractional folded edge ply are arranged along an angle which, in absolute value, is between 15° and 40°, the oblique steel cables of the fractional nonfolded edge ply are arranged along an angle which, in absolute value, is between 15° and 40°, and the oblique steel cables of the normal nonfolded edge ply are arranged along an angle which, in absolute value, is between 15° and 30°, all of said angles being measured with respect to the circumferential direction of the tire.

4. The improved tire defined by claim 1 wherein the fractional folded edge ply has a median zone along which said ply is interrupted.

5. The improved tire defined by claim 1 wherein the two edges of the fractional folded edge ply are folded radially inwards.

6. The improved tire defined by claim 1 wherein the two edges of the fractional folded edge ply are folded radially outwards.

7. The improved tire defined by claim 1 wherein the oblique steel cables of the fractional folded edge ply and the oblique steel cables of the fractional nonfolded edge ply are both arranged along an angle which, in absolute value, is 26°, whereas the oblique steel cables of the normal nonfolded edge ply are arranged along an angle which, in absolute value, is 20°, all of said angles being measured with respect to the circumferential direction of the tire.

8. The improved tire defined by claim 1 wherein the angle between the oblique steel cables of the fractional folded edge ply and the circumferential direction of the tire and the angle between the oblique steel cables of the fractional nonfolded edge ply and the circumferential direction of the tire do not differ by more than 5°.

* * * * *

UNITED STATES PATENT AND TRADEMARK OFFICE
CERTIFICATE OF CORRECTION

PATENT NO. : 4,184,529
DATED : January 22, 1980
INVENTOR(S) : JACQUES BOILEAU

It is certified that error appears in the above-identified patent and that said Letters Patent are hereby corrected as shown below:

First page, Item [30], "Feb. 8, 1977" should read -- Aug. 2, 1976 --.

Col. 1, line 23, "piles" should read -- plies --. Col. 2, line 55, "to" should read -- of --; line 65, after "edge" insert -- ply --. Col. 6, line 43, "oreinted" should read -- oriented --.

Signed and Sealed this

Thirteenth Day of May 1980

[SEAL]

Attest:

SIDNEY A. DIAMOND

*Attesting Officer*     *Commissioner of Patents and Trademarks*